United States Patent
Choi et al.

(10) Patent No.: US 12,522,082 B2
(45) Date of Patent: Jan. 13, 2026

(54) SOLAR CELL SYSTEM

(71) Applicants: Hyundai Motor Company, Seoul (KR); Kia Corporation, Seoul (KR); Incheon National University Research and Business Foundation, Incheon (KR)

(72) Inventors: Jae Hyuk Choi, Seoul (KR); Byeong Seob Song, Suwon-si (KR); Han Shin Youn, Incheon (KR); Ji Hoon Lim, Incheon (KR); Dong In Lee, Incheon (KR)

(73) Assignees: Hyundai Motor Company, Seoul (KR); Kia Corporation, Seoul (KR); Incheon National University Research and Business Foundation, Incheon (KR)

( * ) Notice: Subject to any disclaimer, the term of this patent is extended or adjusted under 35 U.S.C. 154(b) by 852 days.

(21) Appl. No.: 17/805,959

(22) Filed: Jun. 8, 2022

(65) Prior Publication Data

US 2023/0031614 A1 Feb. 2, 2023

(30) Foreign Application Priority Data

Jul. 28, 2021 (KR) .......................... 10-2021-0099396

(51) Int. Cl.
*B60L 8/00* (2006.01)
*H02J 7/35* (2006.01)
*H02M 3/335* (2006.01)

(52) U.S. Cl.
CPC ................ *B60L 8/003* (2013.01); *H02J 7/35* (2013.01); *H02M 3/33584* (2013.01); *B60L 2210/10* (2013.01); *H02J 2207/20* (2020.01); *H02J 2300/26* (2020.01)

(58) Field of Classification Search
CPC ........................................................ B60L 8/003
USPC ......................................................... 320/101
See application file for complete search history.

(56) References Cited

U.S. PATENT DOCUMENTS

| | | | | |
|---|---|---|---|---|
| 6,833,635 | B2 * | 12/2004 | Kippley | H02J 9/062 307/83 |
| 7,259,474 | B2 * | 8/2007 | Blanc | H02J 1/10 307/45 |
| 7,471,014 | B2 * | 12/2008 | Lum | H02J 1/10 307/82 |
| 2009/0289618 | A1 * | 11/2009 | Tajima | G01R 19/175 324/127 |
| 2012/0092905 | A1 * | 4/2012 | Srighakollapu | H02M 7/53871 363/37 |

(Continued)

*Primary Examiner* — Jerry D Robbins
(74) *Attorney, Agent, or Firm* — Slater Matsil, LLP (57) ABSTRACT

An embodiment solar cell system includes a first photovoltaic (PV) module and a second PV module connected in series with each other, a differential power processing (DPP) converter configured to convert electricity generated by the first PV module and the second PV module, using a magnetic material having a multi-winding structure, and to provide the converted electricity to a battery, and a control signal generator configured to generate a control signal that controls a main switch for controlling an input-side current path and an output-side current path of the DPP converter, and to adjust a pulse width of the control signal such that a magnetizing current of the DPP converter becomes substantially zero.

20 Claims, 11 Drawing Sheets

(56) References Cited

U.S. PATENT DOCUMENTS

2016/0233673 A1\* 8/2016 Gazit ........................ H02J 1/10
2020/0014202 A1\* 1/2020 Gazit ........................ H02J 1/08
2021/0391726 A1\* 12/2021 Avestruz ........... H02M 3/33569

\* cited by examiner

SOLAR CELL SYSTEM

CROSS-REFERENCE TO RELATED APPLICATIONS

This application claims the benefit of Korean Patent Application No. 10-2021-0099396, filed on Jul. 28, 2021, which application is hereby incorporated herein by reference.

TECHNICAL FIELD

The present disclosure relates to a solar cell system.

BACKGROUND

A solar cell system is composed of an array by connecting photovoltaic (hereinafter "PV") modules in series or in parallel for a required power generation. A plurality of PV modules constituting the array may have different power generation amounts, and an imbalance of voltage and current generated when the power generation amounts are different may cause overall power loss. This results in a decrease in power production of an entire solar cell system because a PV module with a small amount of power follows a low short-circuit current.

A disadvantage of the solar cell system due to power imbalance is more pronounced in a solar system installed in a vehicle, which is a mobile means.

As a utilization of the solar cell system increases, research of improvement measures for improving a power imbalance issue is intensifying.

SUMMARY

The present disclosure relates to a solar cell system. Particular embodiments relate to a solar cell system for charging a vehicle battery.

Embodiments of the present disclosure can solve problems occurring in the prior art while advantages achieved by the prior art are maintained intact.

An embodiment of the present disclosure provides a solar cell system capable of compensating for power imbalance between PV modules.

In addition, an embodiment of the present disclosure provides a solar cell system capable of using a converter of a smaller size.

In addition, an embodiment of the present disclosure provides a solar cell system capable of increasing energy efficiency.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a solar cell system includes a first photovoltaic (PV) module and a second PV module connected in series with each other, a differential power processing (DPP) converter that converts electricity generated by the first PV module and the second PV module, using a magnetic material having a multi-winding structure, and provides the converted electricity to a battery, and a control signal generator that generates a control signal that controls a main switch for controlling an input-side current path and an output-side current path of the DPP converter and adjusts a pulse width of the control signal such that a magnetizing current of the DPP converter becomes substantially zero.

In an embodiment, the DPP converter may include a first input circuit including a first winding wound around the magnetic material and a first main switch controlling a current flowing through the first winding, and connected to the first PV module, a second input circuit including a second winding coupled to the first winding and wound around the magnetic material and a second main switch controlling a current flowing through the second winding, and connected to the second PV module, and an output circuit connected to the battery, including a third winding wound around the magnetic material and an output control switch controlling a current flowing through the third winding.

In an embodiment, the control signal generator may generate a first control signal which simultaneously controls the first and second main switches, and a second control signal which operates the output control switch complementary to the first main switch.

In an embodiment, the control signal generator, during a first period, by setting the first control signal to a turn-on voltage to induce a current flow through the first and second windings and blocking a current flow in the output circuit, may induce a leakage current to flow to a PV module in which a surplus current does not occur when the surplus current occurs in any one of the first PV module or the second PV module.

In an embodiment, during a second period and a third period subsequent to the first period, the control signal generator may reduce the magnetizing current by setting the first control signal to a turn-off voltage.

In an embodiment, during a fourth period subsequent to the third period, the control signal generator may reduce a current applied to a magnetizing inductor of the DPP converter such that the magnetizing current has a zero current characteristic, by setting the second control signal to a turn-on voltage to induce the current flow only in the output circuit.

In an embodiment, during a fifth period subsequent to the fourth period, the control signal generator may discharge energy stored in a leakage inductance of the output winding by setting the second control signal to a turn-off voltage.

In an embodiment, during a sixth period subsequent to the fifth period, the control signal generator may perform a zero voltage switching of the first and second main switches by setting the first control signal to the turn-on voltage.

In an embodiment, the control signal generator may include a first controller that removes a deviation between the magnetizing current and a reference current having a value of zero such that the magnetizing current has a zero current characteristic.

In an embodiment, the first controller may sense the magnetizing current and may compare an average value of the sensed magnetizing current with the reference current to obtain the deviation.

In an embodiment, the first controller may include a low-pass filter that averages the magnetizing current, a first analog-to-digital converter that converts an output of the low-pass filter into a digital signal, a comparator that compares an output value of the first analog-to-digital converter with a reference voltage, and a proportional integral controller that proportionally integrates an output result of the comparator to output a first duty that determines a duty of the control signal for removing the deviation.

In an embodiment, the control signal generator may further include a second controller that enhances a dynamic characteristic determining a duty.

In an embodiment, the second controller may generate a second duty to reflect a predicted defect, based on an input voltage average value obtained by averaging an input voltage of the first PV module and an input voltage of the second PV module, and battery voltage.

In an embodiment, the second controller may include a second analog-to-digital converter that converts the input voltage of the first PV module, the input voltage of the second PV module, and the battery voltage into a digital signal, respectively, and generates a first digital input voltage, a second digital input voltage, and a digital battery voltage, an average value calculator that calculates an average between the first digital input voltage and the second digital input voltage to calculate the input voltage average value in a digital form, and a feedforward controller that generates the second duty, based on the input voltage average value and the digital battery voltage.

In an embodiment, the feedforward controller may generate the second duty to be inversely proportional to a sum of the input voltage average value and the digital battery voltage, and to be proportional to the input voltage average value.

In an embodiment, the control signal generator may further include a combiner that adds the first duty and the second duty to generate a final duty that determines the pulse width of the control signal.

In an embodiment, the control signal generator may further include a pulse width modulation controller that performs a pulse width modulation based on the duty of the control signal to output the control signal.

In an embodiment, a winding ratio of the first winding, the second winding, and the third winding may be 1:1:1.

In an embodiment, the first input circuit and the second input circuit may constitute a flyback DPP converter.

In an embodiment, the solar cell system may further include a controller that charges the battery with power generated from the first PV module and the second PV module, based on a maximum power point tracking (MPPT) control.

According to an embodiment of the present disclosure, a solar cell system includes a first photovoltaic (PV) module and a second PV module connected in series with each other, a differential power processing (DPP) converter that converts electricity generated by the first PV module and the second PV module, using a magnetic material having a multi-winding structure, and provides the converted electricity to a battery, a control signal generator that generates a control signal that controls a main switch for controlling an input-side current path and an output-side current path of the DPP converter, a first controller that adjusts a pulse width of the control signal such that a magnetizing current of the DPP converter becomes substantially zero, and a second controller that improves a dynamic characteristic in which the first controller adjusts the pulse width of the control signal.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 11.

Figure 1:
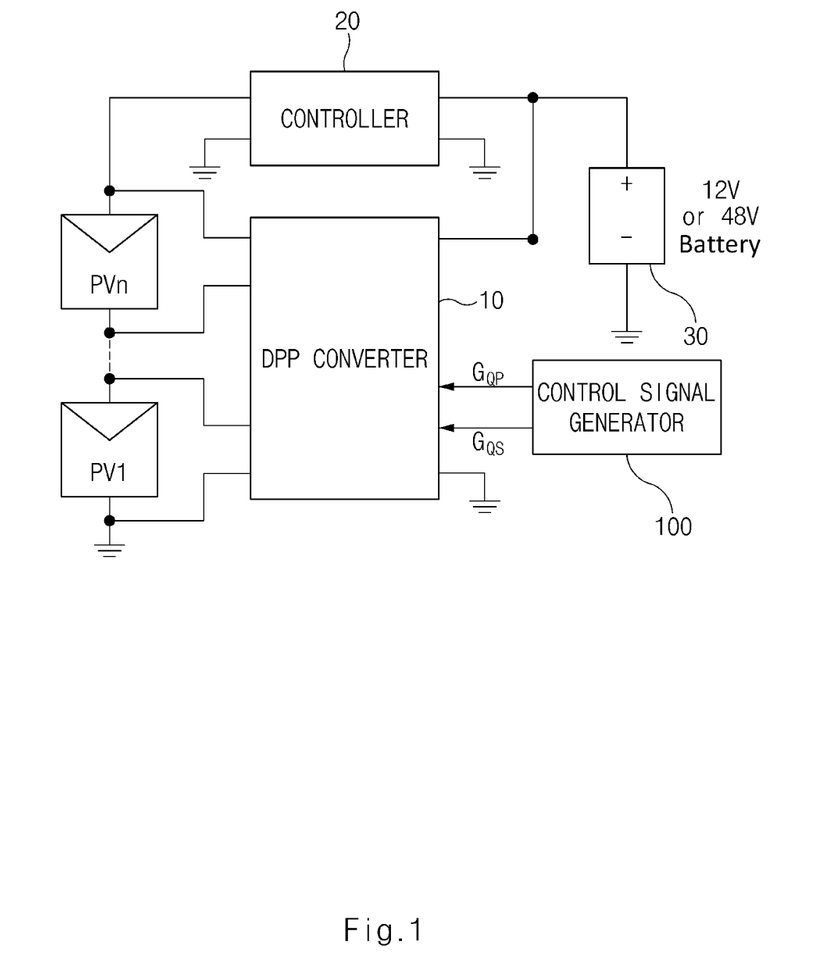
FIG. 1 is a block diagram illustrating a configuration of a solar cell system according to an embodiment of the present disclosure.

FIG. 1 is a block diagram illustrating a configuration of a solar cell system according to an embodiment of the present disclosure.

Referring to FIG. 1, a solar cell system according to an embodiment of the present disclosure may include a first PV module PV1 to an n-th (where, 'n' is a natural number greater than or equal to 2) PV module PVn, a differential power processing (hereinafter, referred to as 'DPP') converter 10, a controller 20, a battery 30, and a control signal generator 100. The first PV module PV1 to the n-th PV module PVn may constitute a solar panel and may convert solar energy into electrical energy. The solar panel may be installed on the roof of a vehicle, but the scope of the present disclosure is not limited thereto, and the solar panel may be installed wherever the solar panel can be installed, such as a door, a lid, a bonnet (i.e., a trunk), etc. The first PV module PV1 to the n-th PV module PVn are solar cells, and as a type of the solar cell, an amorphous silicon solar cell or a crystalline silicon solar cell may be used. In particular, a dye-sensitized solar cell, a perovskite-based solar cell, an organic solar cell, a cadium-theryllium (CdTe) solar cell, a copper-indium-gallium-selenium (CIGS) solar cell, etc. may be used individually or in combination.

The DPP converter 10 is electrically connected to the first PV module PV1 to the n-th PV module PVn, and may control an operation of converting power generated by the first PV module PV1 to the n-th PV module PVn. The DPP converter 10 is bidirectional and may be implemented based on a DC-DC converter to which an electrical isolation is applied. The DPP converter 10 may use an integrated magnetic material for a multi-winding structure.

The controller 20 may control an output of the DPP converter 10. The controller 20 may perform a maximum power point tracking (MPPT) control so as to control the power generated by the first PV module PV1 to the n-th PV module PVn. Specifically, the controller 20 may perform the MPPT to output a maximum power from the first PV module PV1 to the n-th PV module PVn, based on a preset algorithm, by using an output voltage and an output current of the first PV module PV1 to the n-th PV module PVn, and for this, the controller 20 may control an output and an operation of the DPP converter 10.

Since the controller 20 should control converters one-to-one, the size of the controller 20 increases depending on the number of converters. However, since the DPP converter 10 according to an embodiment of the present disclosure controls only one flyback converter implemented with one primary side and one secondary side, even in a solar cell system implemented with a plurality of PV modules, the size of the controller 20 may be decreased.

The battery 30 may correspond to a voltage source connected to an electric circuit, and may mean, for example, a rechargeable battery of an electric vehicle.

The control signal generator 100 may generate control signals for controlling an operation of the DPP converter 10. In particular, the control signal generator 100 may adjust a pulse width of the control signals such that a magnetizing current of the DPP converter 10 becomes zero. The magnetizing current of the DPP converter 10 is a current induced in an inductor of a first input circuit INC1 corresponding to the primary side of the DPP converter 10 and may be the same as a leakage current of a secondary side.

Hereinafter, a detailed configuration of the DPP converter and a control signal generator and its operation will be described as follows.

Figure 2:
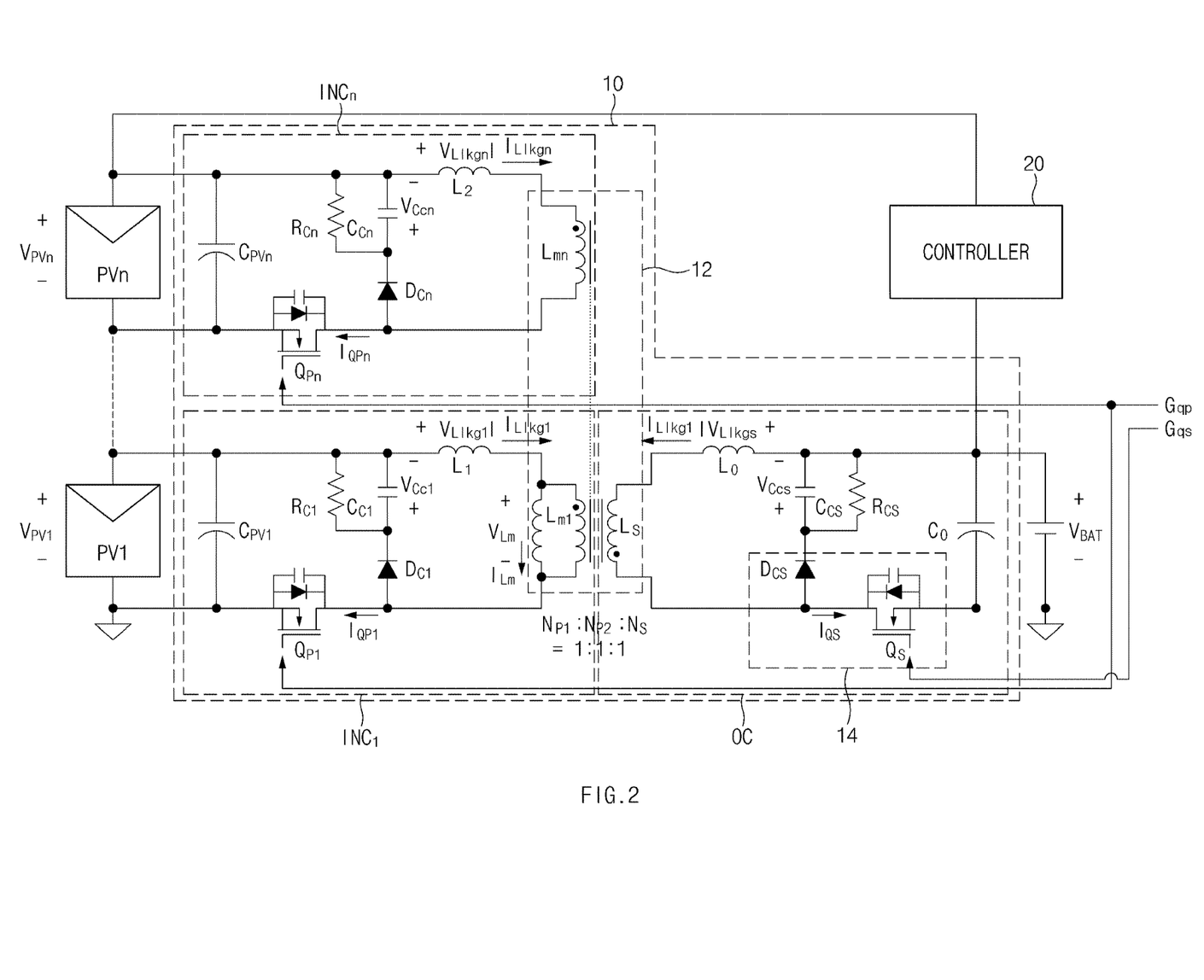
FIG. 2 is a circuit diagram illustrating a configuration of a DPP converter.
Figure 3:
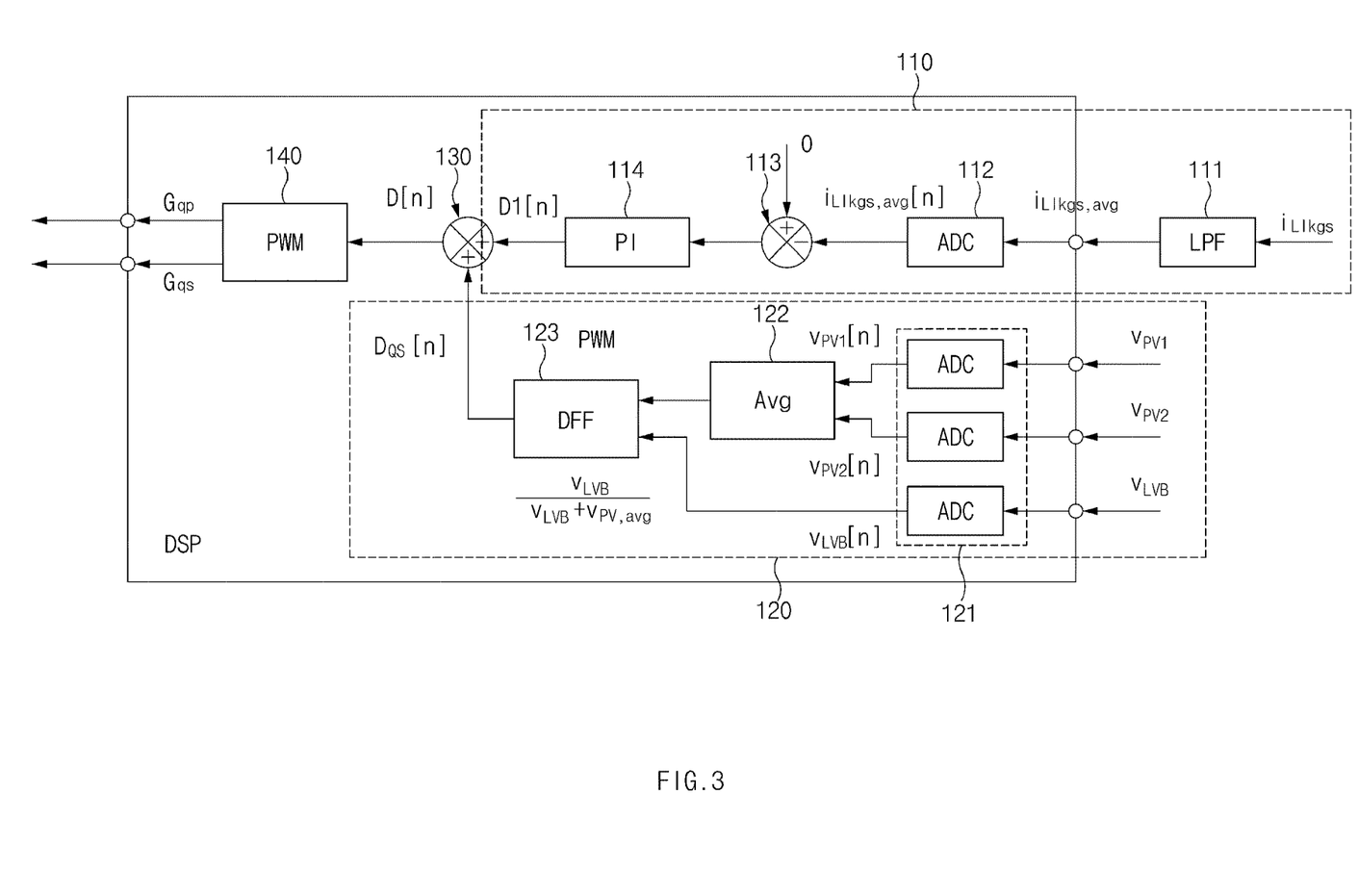
FIG. 3 is a diagram illustrating a configuration of a control signal generator.

FIG. 2 is a circuit diagram illustrating a configuration of a DPP converter illustrated in FIG. 1. FIG. 3 is a diagram illustrating a configuration of a control signal generator illustrated in FIG. 1.

Referring to FIG. 2, the DPP converter 10 according to an embodiment of the present disclosure may include the first input circuit INC1 to an n-th input circuit INCn, and an output circuit OC. In detail, the DPP converter 10 according to this embodiment of the present disclosure may be composed of a plurality of input circuits and one output circuit. The first input circuit INC1 may be connected to the first PV module PV1 and may induce a current flow through a first winding Lm1 based on the power generated by the first PV module PV1. The first input circuit INC1 may include the first winding Lm1, a first inductor L1 connected in series with the first winding Lm1, a first RCD snubber circuit Rc1, Cc1, and Dc1 connected with the first inductor L1, and a first main switch Qp1.

The n-th input circuit INCn may be connected to the n-th PV module PVn and may induce a current flow through an n-th winding Lmn based on the power generated by the n-th PV module PVn. The n-th input circuit INCn may include the n-th winding Lmn, an n-th inductor Ln connected in series with the n-th winding Lmn, and an n-th RCD snubber circuit Rcn, Ccn, and Dcn connected with the n-th inductor Ln, and an n-th main switch Qpn.

As in the above description, second to (n−1)-th input circuits may be implemented with the same circuit configuration as the first input circuit INC1 or the n-th input circuit INCn.

The output circuit OC may include an output winding Ls, an output inductor Lo, and an output RCD snubber circuit Rcs, Ccs, and Dcs. The first winding Lm1 to the n-th winding Lmn and the output winding Ls may be wound around a magnetic material 12. The first winding Lm1 to the n-th winding Lmn may be in a coupling state with each other. A winding ratio of the first winding Lm1, the n-th winding Lmn, and the output winding Ls wound around the magnetic material 12 may be as follows:

$$Np1:Npn:Ns=1:1:1.$$

In this case, Np1 is the number of windings of the first winding Lm1, Npn is the number of windings of the n-th winding Lmn, and Ns is the number of windings of the output winding Ls.

As illustrated in FIG. 2, the solar cell system according to an embodiment of the present disclosure may be implemented using a DPP converter having only one output circuit OC.

In a conventional converter, the input circuits and the output circuits are configured in the same number as the PV modules. In detail, in the solar cell system in which the PV modules are composed of 'n', the conventional converter requires 'n' input circuits and 'n' output circuits corresponding thereto one-to-one.

In contrast, according to an embodiment of the present disclosure, in the solar cell system composed of 'n' PV modules, since only one output circuit is used, the size of the DPP converter may be significantly reduced.

Referring to FIG. 3, the control signal generator 100 according to an embodiment of the present disclosure may generate first and second control signals Gqp and Gqs. The first control signal Gqp may simultaneously turn on or turn off the first main switch Qp1 to the n-th main switch Qpn illustrated in FIG. 2. The second control signal Gqs controls an output control switch Qs shown in FIG. 2. Operation timings of the first control signal Gqp and the second control signal Gqs may be complementary to each other. That is, when the first control signal Gqp is in a turn-on state, the second control signal Gqs may be in a turn-off state. When the first main switch Qp1 to the n-th main switch Qpn and the output control switch Qs are implemented with the same type of transistors, the first control signal Gqp and the second control signal Gqs may be waveforms having an opposite phase to each other. Accordingly, the control signal generator 100 may generate a driving signal having a duty and may invert a phase of the driving signal to generate the first and second control signals Gqp and Gqs.

The control signal generator 100 may include a first controller 110, a second controller 120, a coupler 130, and a pulse width modulation (PWM) controller 140. The first controller no may remove a deviation between the magnetizing current and a reference current having a value of 'o' such that the magnetizing current has a zero current characteristic in an operation of the DPP converter. The magnetizing current is a current induced inside the DPP converter and may refer to a current induced in the first winding Lm1. To this end, the first controller no may sense the magnetizing current in a preset time unit, and may compare an average value of the sensed magnetizing current with the reference current to obtain the deviation. Since the magnetizing current is the same value as a second leakage current iLlkgs of the output circuit corresponding to the secondary side of the converter, the sensed value of the second leakage current iLlkgs may be used as the sensing value of the magnetizing current.

In more detail, the first controller no may include a low-pass filter 111, a first analog to digital converter (ADC) 112, a comparator 113, and a proportional integral controller 114.

The low-pass filter 111 may receive the magnetizing current and may calculate an average value of the magnetizing current in analog form, based on a process of filtering the received magnetizing current. The first ADC 112 may convert the average value of the magnetizing current in the analog form output from the low-pass filter 111 into a digital signal iLlkgs,avg[n].

The comparator 113 compares an output value of the first ADC 112 with a reference voltage, and calculates a deviation between the output value of the first ADC 112 and the reference voltage. The reference voltage may be a voltage of '0'.

The proportional integral controller 114 may proportionally integrate the output result of the comparator 113 to output a first duty D1[n] for removing the deviation. The first duty D1[n] may be a duty that determines a pulse width of the control signal.

The second controller 120 may improve dynamic characteristics of a process in which the control signal generator 100 determines the pulse widths of the first and second control signals Gqp and Gqs. The second controller 120 may generate a second duty Dqs[n] based on a feedforward algorithm.

In more detail, the second controller 120 may include a second ADC 121, an average value calculator 122, and a feedforward controller 123.

The second ADC 121 may generate a digital input voltage by converting the input voltage of the PV modules. For example, when the PV modules are composed of the first and second PV modules PV1 and PV2, the second ADC 121 may convert the input voltage of the first PV module PV1 to generate a first digital input voltage Vpv1[n], and may convert the input voltage of the second PV module PV2 to generate a second digital input voltage Vpv2[n]. Also, the second ADC 121 may convert a battery voltage into a digital signal to generate a digital battery voltage Vlvb[n].

The average value calculator 122 may calculate the average of the first digital input voltage Vpv1[n] and the second digital input voltage Vpv2[n] to generate an input voltage average value Vpv,avg of a digital form.

The feedforward controller 123 may generate the second duty Dqs[n] based on the input voltage average value Vpv,avg and the digital battery voltage Vlvb[n].

The coupler 130 may sum the first duty D1[n] generated by the first controller 110 and the second duty Dqs[n] generated by the second controller 120 to generate a final duty D[n] for adjusting the pulse width of the control signal.

The pulse width modulation controller 140 may determine the pulse widths of the first and second control signals by performing a pulse width modulation (PWM) based on the final duty D[n].

The control signal generator wo according to an embodiment of the present disclosure may allow the magnetizing current of the DPP converter 10 operating based on the first and second control signals Gqp and Gqs to converge to zero. That is, the magnetizing current offset may be removed, and the size of the DPP converter 10 may be reduced by removing the magnetizing current offset. A relationship between the operation of the DPP converter 10 and the size of the DPP converter 10 depending on the magnetizing current offset will be described later.

Figure 4:
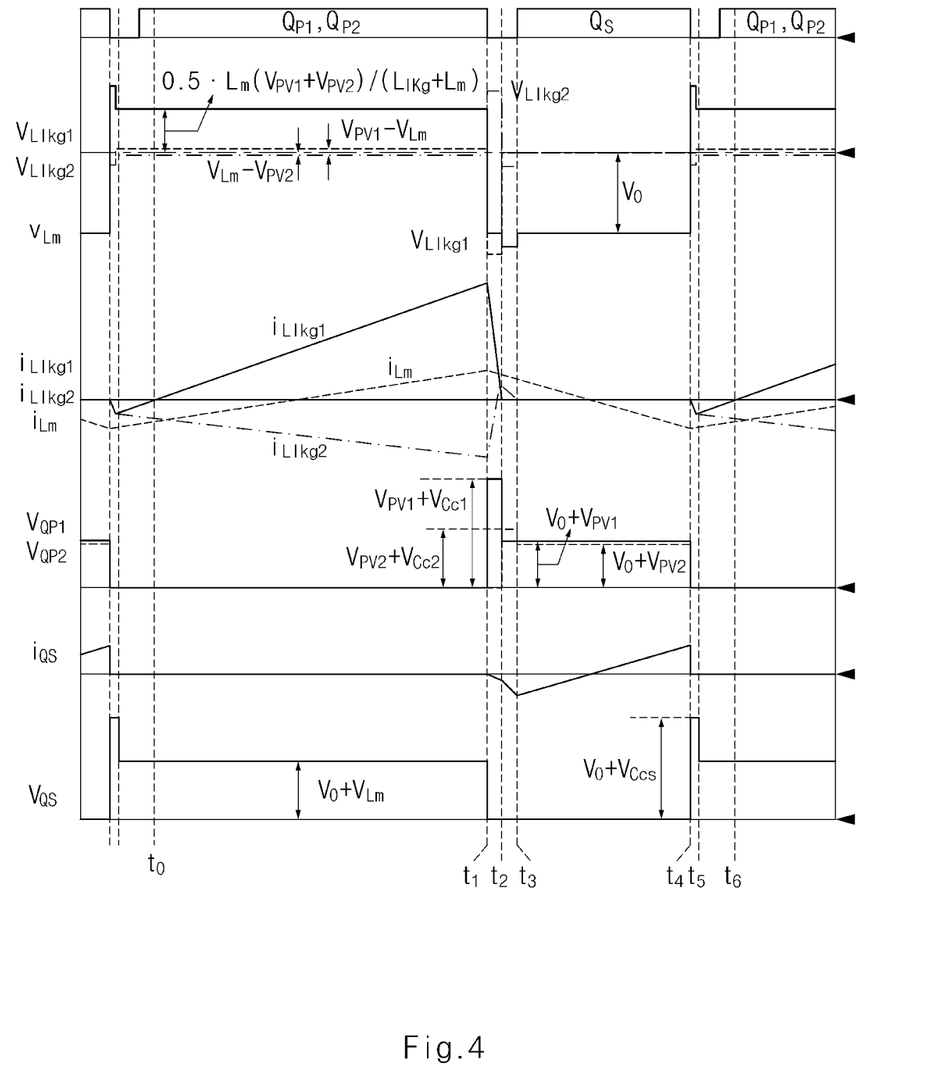
FIG. 4 is a timing diagram describing an operation of a DPP converter according to an embodiment of the present disclosure.

FIG. 4 is a timing diagram illustrating an operation of a DPP converter according to an embodiment of the present disclosure. FIGS. 5 to 10 are diagrams describing an operation of the DPP converter 10 according to the timing diagram illustrated in FIG. 4. FIGS. 4 to 10 are diagrams based on an embodiment of a DPP converter implemented with two PV modules. In addition, FIGS. 4 to 10 illustrate the DPP converter 10 that operates based on the case where an amount of power generated by the first PV module PV1 is greater than that of the second PV module PV2.

With reference to FIGS. 4 to 10, the operation of the DPP converter according to the control signals is as follows.

Figure 5:
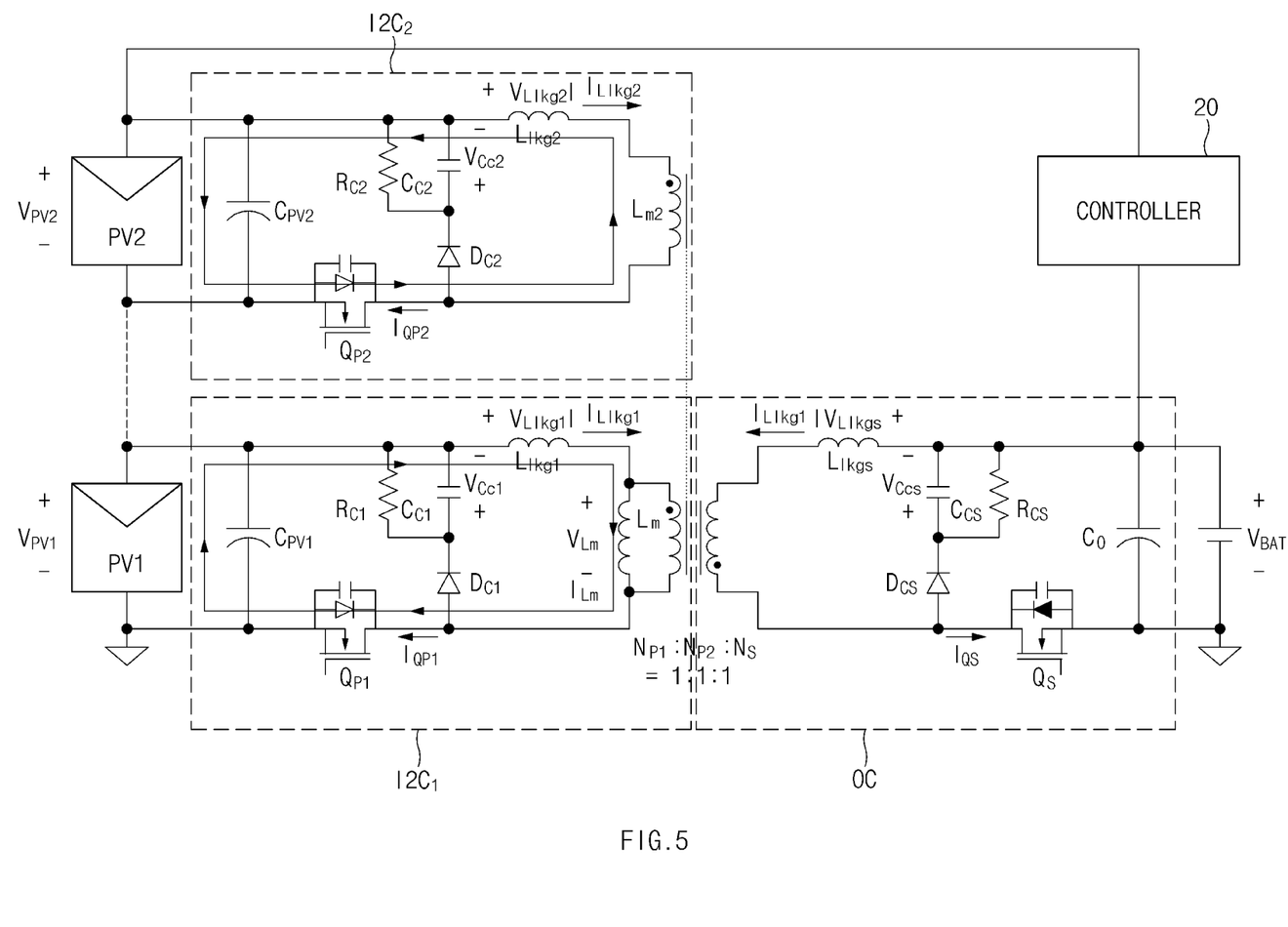
FIGS. 5 to 10 are diagrams describing an operation of a DPP converter according to a timing diagram.

Referring to FIGS. 4 and 5, during a first period to t1, the first and second main switches Qp1 and Qp2 may be turned on in response to the first control signal Gqp. Since an amount of power generation of the first PV module PV1 is greater than that of the second PV module PV2, a first PV module voltage VPV1 is greater than a second PV module voltage VPV2. Accordingly, a voltage VLm applied to the first winding Lm1 has a value between the first PV module voltage VPV1 and the second PV module voltage VPV2, and a magnetizing current iLm (or magnetizing inductance current) flowing through the first winding Lm1 may increase with a first slope.

A first leakage inductance Llkg1 of the first winding Lm1 of the first PV module PV1 may receive a positive voltage VPV1-VLm, and then a first leakage current iLlkg1 of the first leakage inductance Llkg1 may increase. A second leakage inductance Llkg2 of a second winding Lm2 of the second PV module PV2 receives a negative voltage VPV2-VLm, and then a second leakage current iLlkg2 of the second leakage inductance Llkg2 may decrease. Due to a difference in power generation between the first PV module PV1 and the second PV module PV2, the first leakage current iLlkg1 corresponding to the first PV module PV1 increases with a second slope greater than the first slope. In addition, the second leakage current iLlkg2 corresponding to the second PV module PV2 may decrease with a third slope.

In this case, since the first winding Lm1 and the second winding Lm2 of the DPP converter 10 are coupled, the second leakage current iLlkg2 is as follows:

$$iLlkg2 = -(iLlkg1 - iLm).$$

In detail, it may be seen that a surplus current from the first PV module PV1 flows into the second PV module PV2 during the first period to compensate for an imbalance of power generation between the PV modules.

Figure 6:
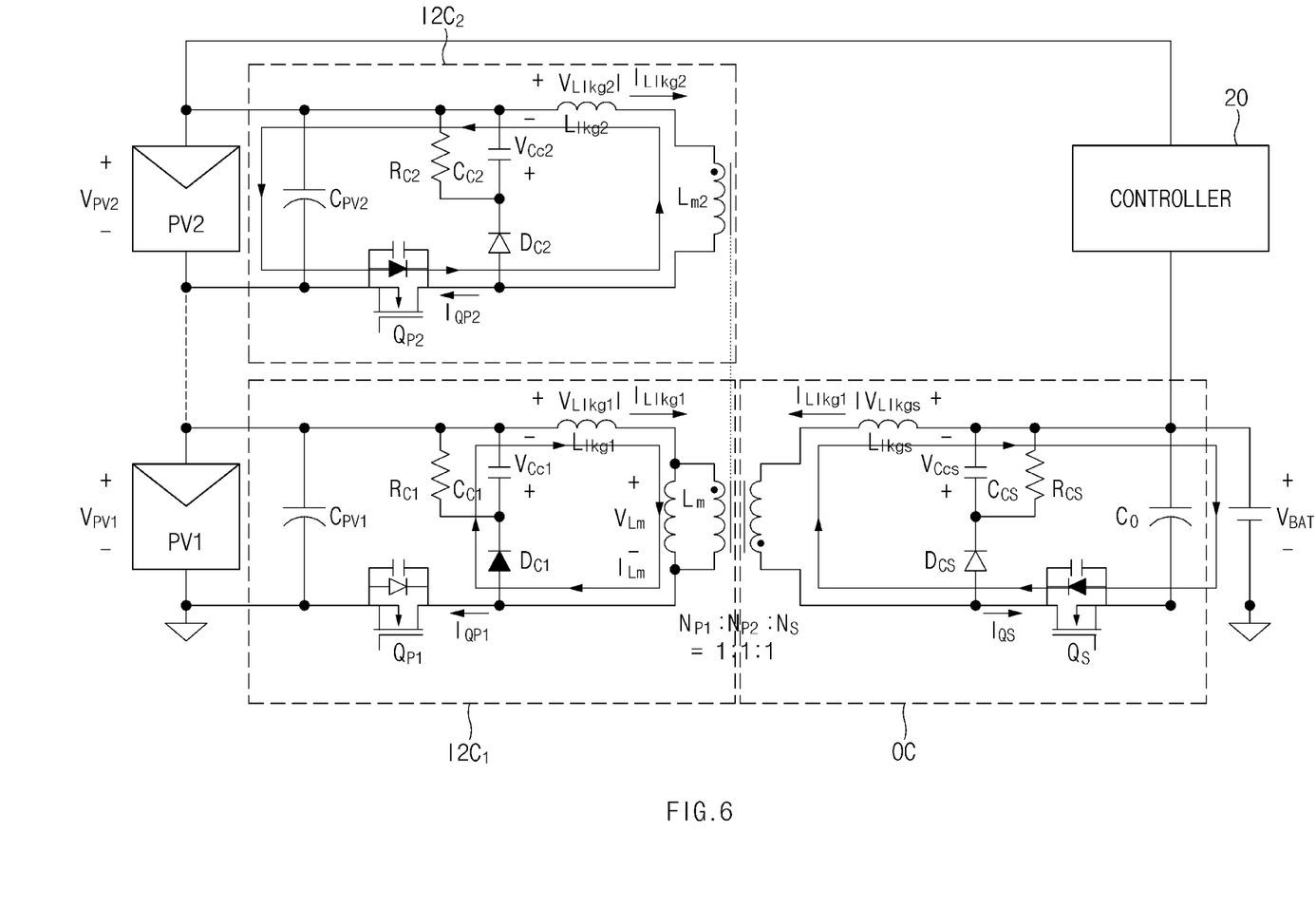

Referring to FIGS. 4 and 6, during a second period t1 to t2, the first and second main switches Qp1 and Qp2 are turned off in response to the first control signal Gqp, and a body diode of the output control switch Qs may be conductive. The energy stored in the first leakage inductance Llkg1 may be consumed through the first RCD snubber circuit Rc1, Cc1, and Dc1, and the energy stored in the second leakage inductance Llkg2 may be discharged to the second PV module PV2. In the DPP converter 10 of the solar cell system according to this embodiment of the present disclosure, since the magnetizing current is removed and the number of windings is reduced, energy emission through the leakage inductance is reduced. Accordingly, a snubber loss may be reduced.

The inductance Lm of the first inductor starts to decrease the magnetizing current iLm due to an output voltage (−Np1/Ns·VO) projected to the primary side. In this case, Np1 is the number of first windings corresponding to the first PV module PV1, Ns is the number of windings of the output winding Ls of the output circuit OC, and VO is the output voltage.

Figure 7:
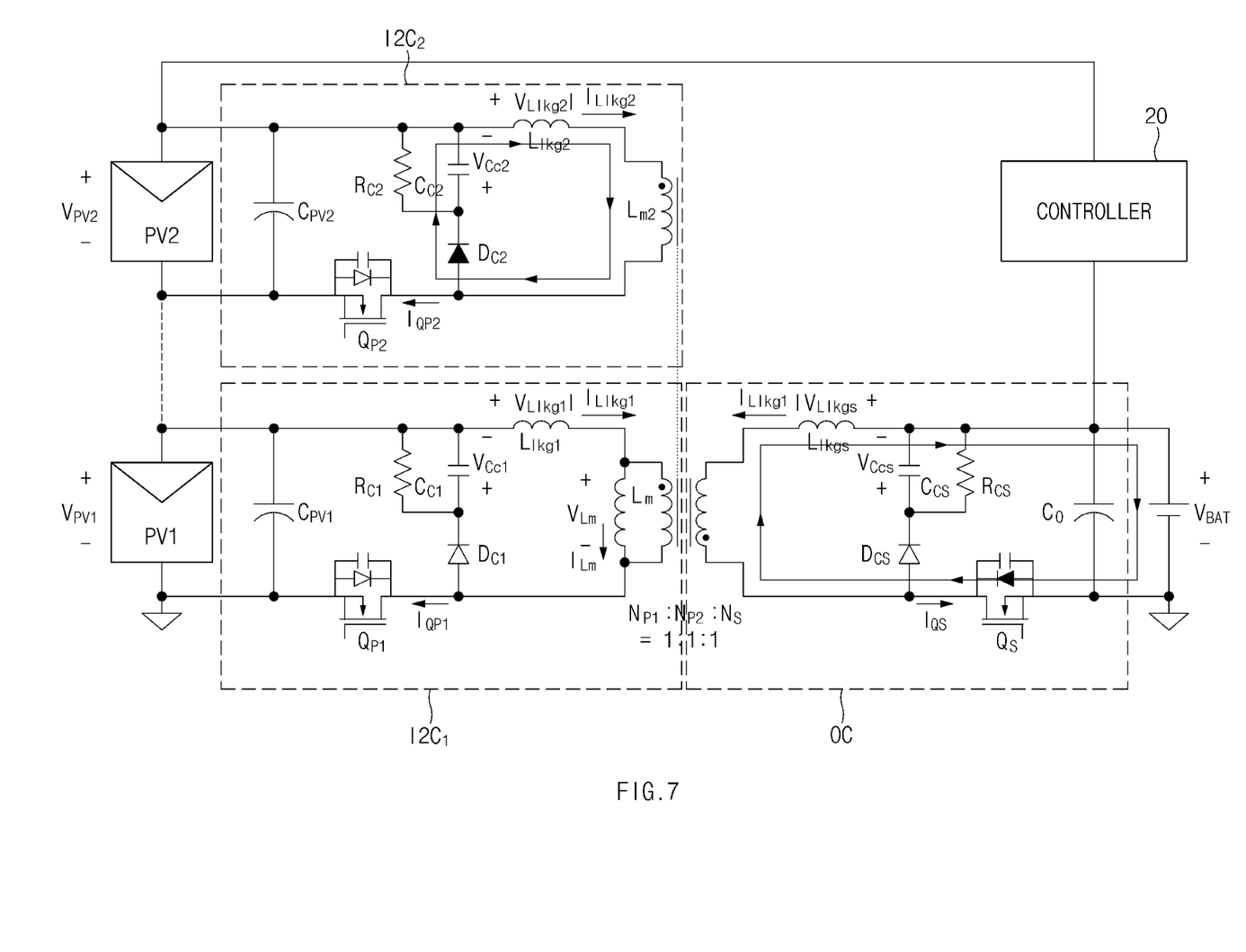

Referring to FIGS. 4 and 7, during a third period t2 to t3, the first and second main switches QP1 and QP2 may maintain the turn-off state, and the body diode of the output control switch QS may maintain a conduction state.

The energy stored in the second leakage inductance Llkg2 may be consumed through the second RCD snubber Rc2, Cc2, and Dc2, and a voltage (−NP1/NS·VO) is applied to the inductance Lm, thereby the magnetizing current iLm may decrease.

Figure 8:
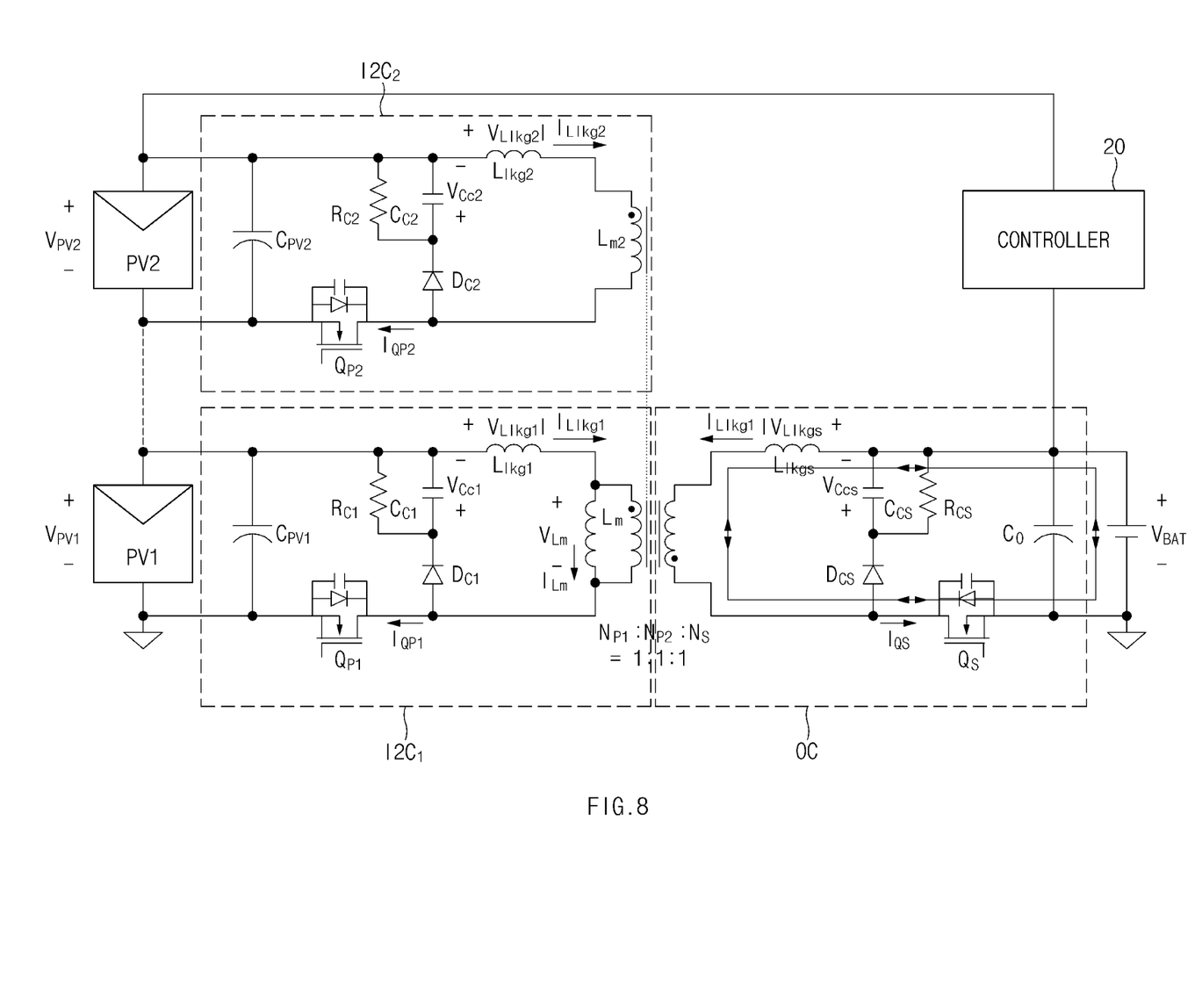

Referring to FIGS. 4 and 8, during a fourth period t3 to t4, the output control switch QS may be turned on.

A voltage (−NP1/NS×VO) is applied to the inductance Lm, so that the magnetizing current iLm continuously decreases, and as the value changes from positive to negative, the DPP converter 10 may be reset. In particular, as illustrated in FIG. 4, it may be seen that the offset of the magnetizing current iLm becomes 'o' in the fourth period t3 to t4. As described above, since the offset of the magnetizing current iLm does not exist, it may be seen that the size of the DPP converter 10 may be reduced. The relationship between the magnetizing current offset and the size of the DPP converter 10 is as follows.

An area product of the converter may be expressed by the following Equation 1:

$$A_p = A_e \cdot A_w = \frac{L_m I_{Lmpeak}}{N_p B_m} \cdot \left(\frac{N_{mw} \cdot I_{P,rms} N_P + I_{s,rms} N_s}{K_u j}\right).$$ Equation 1

In this case, Ap is the area product of the converter, Ae is a cross-sectional area of a core, Aw is a window area of the core, Lm is the magnetizing inductor, ILmpeak is a current peak value of the inductor, Np is the number of turns of the input circuit corresponding to the primary side, Bm is a magnetic flux density, Nmw is the number of primary multi-windings, Ip,rms is a primary rms current, Is,rms is a secondary rms current, Ns is the number of secondary turns, Ku is a utilization factor, and 'j' is a current density.

In the conventional case, since the peak value of the inductor current and the rms current are large depending on the magnetizing current offset, Ae and Aw may increase, and accordingly, the area product may increase. That is, the size of the converter may be proportional to the magnitude of the magnetizing current offset.

In contrast, in the present embodiment of the present disclosure, since the magnetizing current offset is removed, it is possible to reduce the size of the DPP converter 10.

Figure 9:
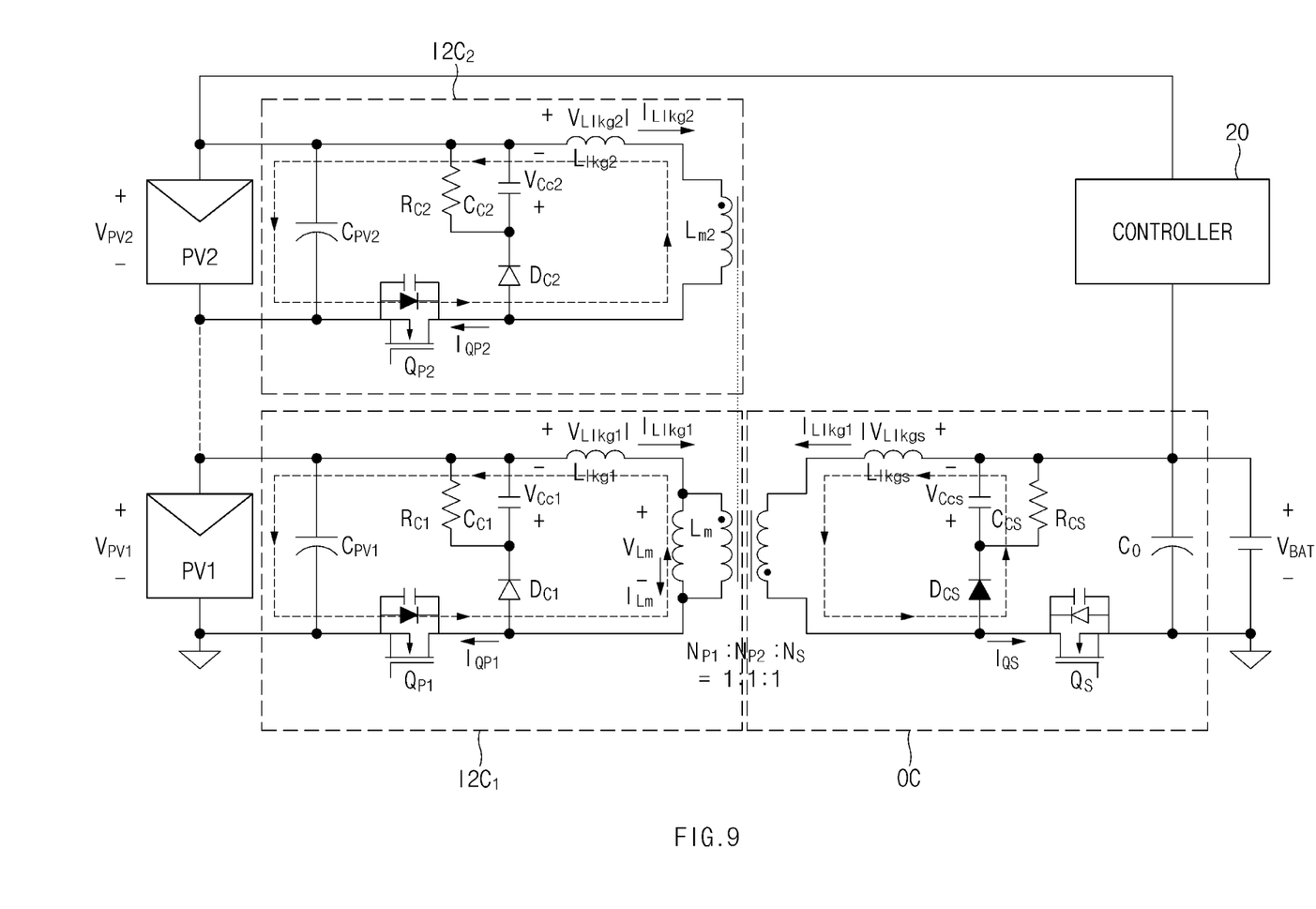

Referring to FIGS. 4 and 9, during a fifth period t4 to t5, the output control switch QS is turned off. The energy stored in the leakage inductance Llkgs of the output winding Ls is discharged through the second RCD snubber Rc2, Cc2, and Dc2. The leakage current is projected to the primary side, so that the diodes of the first and second main switches QP1 and QP2 conduct and current conversion may occur.

Figure 10:
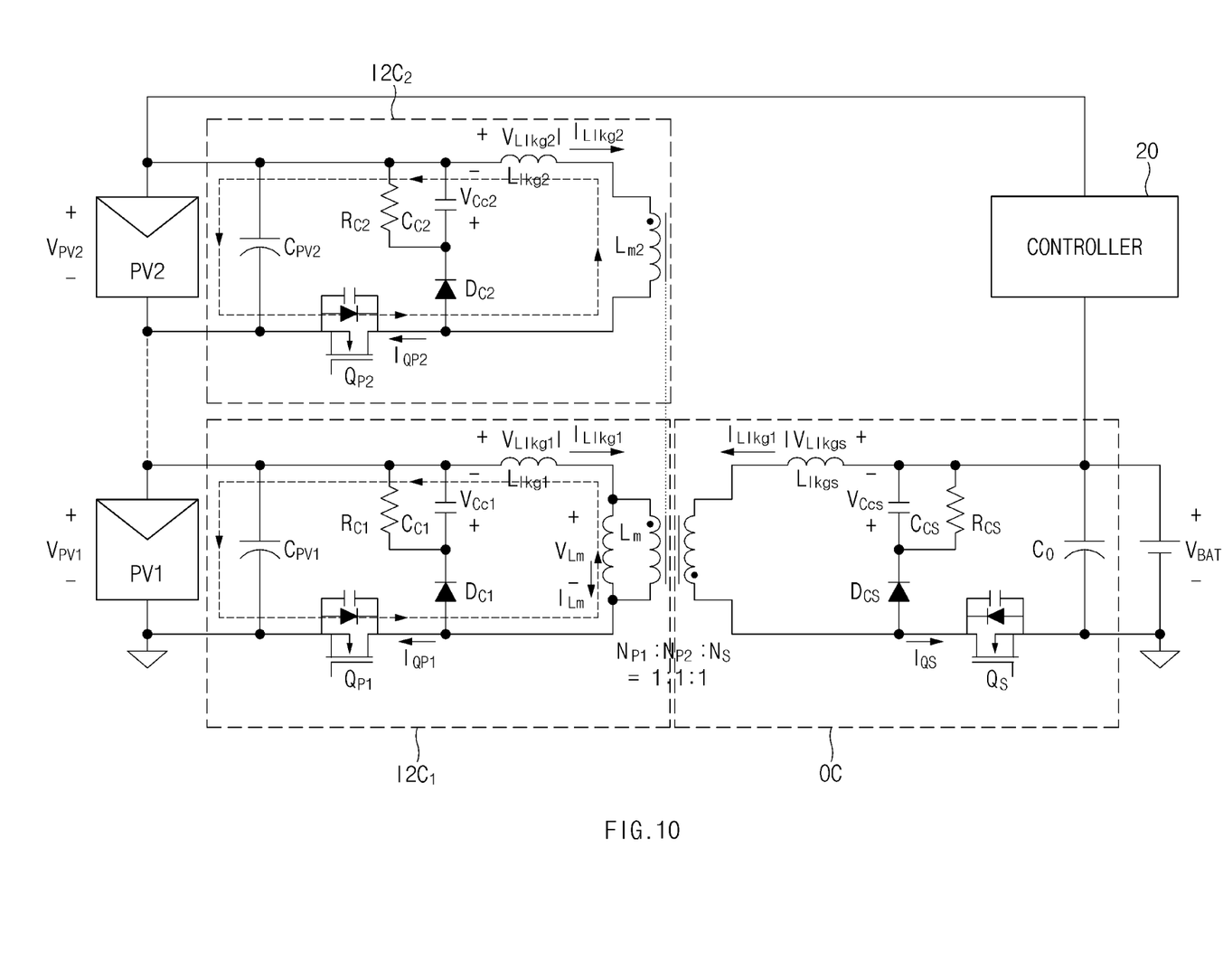

Referring to FIGS. 4 and 10, during a sixth period t5 to t6, the positive voltage VPV1-VLm is applied to the first leakage inductance Llkg1 of the first winding Lm1, and then the first leakage current iLlkg1 of the first leakage inductance Llkg1 may increase. The negative voltage VPV2-VLm is applied to the second leakage inductance Llkg2 of the second winding Lm2 corresponding to the second PV module PV2, and then the second leakage current iLlkg2 of the second leakage inductance Llkg2 may be reduced. While the first leakage current iLlkg1 and the second leakage current iLlkg2 have negative values, a zero voltage switching (ZVS) of the plurality of primary side switches QP1 and QP2 may be performed by turning on the plurality of primary side switches QP1 and QP2.

As described above, since the surplus current and the surplus power from the first PV module PV1 to the DPP converter 10 are provided to the second PV module PV2, the current circulation is performed only within the input circuit of the DPP converter 10, and an average current on the secondary side becomes 'o'.

Figure 11:
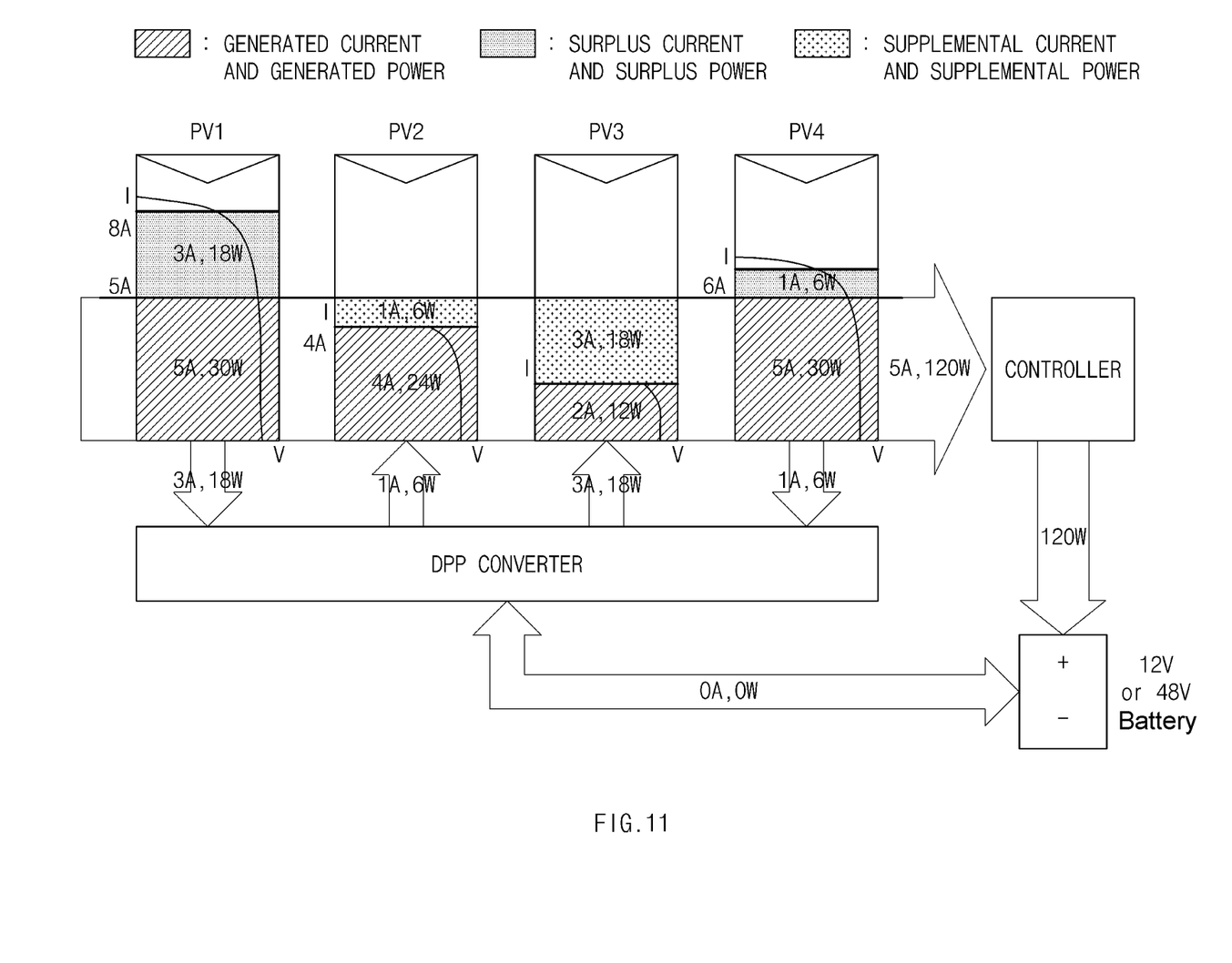
FIG. 11 is a schematic diagram describing a process of how a solar cell system according to an embodiment of the present disclosure solves a charge imbalance.

FIG. 11 is a schematic diagram describing a process of how the solar cell system according to an embodiment of the present disclosure solves a charge imbalance. FIG. 11 illustrates a solar system having four PV modules.

Referring to FIG. 11, in a solar cell system according to an embodiment of the present disclosure, as described based on FIG. 5, while the main switches of the DPP converter are turned on, the surplus current and the surplus power of the PV modules may be provided to the DPP converter, and a supplemental current and a supplemental power of the DPP converter may be provided to the PV modules, which are modules lacking in charge. For example, the surplus current and surplus power (3 A and 18 W) of the first PV module PV1 and the surplus current and surplus power (1 A and 6 W) of a fourth PV module PV4 may be provided to the DPP converter.

In addition, the supplemental current and supplemental power (1 A and 6 W) of the DPP converter may be provided to the second PV module PV2, and the supplemental current and supplemental power (3 A and 18 W) are provided to a third PV module PV3.

As described above, the DPP converter 10 of the solar cell system according to an embodiment of the present disclosure operates to remove the magnetizing current, so that the size of the DPP converter 10 may be reduced.

In addition, since the operation of the DPP converter 10 is performed by a soft switching, it is possible to reduce energy loss.

According to an embodiment of the present disclosure, since surplus power from a PV module is provided to another PV module, power imbalance between PV modules may be compensated.

In addition, according to an embodiment of the present disclosure, since it is possible to reduce the size of a converter for converting the power generated by the PV module, the size of the solar cell system may be reduced.

In addition, according to an embodiment of the present disclosure, by reducing the snubber loss, it is possible to increase the efficiency of the solar cell system.

In addition, various effects may be provided that are directly or indirectly understood through embodiments of the present disclosure.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A solar cell system comprising:
   a first photovoltaic (PV) module and a second PV module connected in series with each other;
   a differential power processing (DPP) converter configured to convert electricity generated by the first PV module and the second PV module, using a magnetic material having a multi-winding structure, and to provide the converted electricity to a battery, wherein the DPP converter comprises:
      a first input circuit connected to the first PV module and including a first winding wound around the magnetic material and a first main switch controlling a current flowing through the first winding,
      a second input circuit connected to the second PV module and including a second winding coupled to the first winding and wound around the magnetic material and a second main switch controlling a current flowing through the second winding, and
      an output circuit connected to the battery and including a third winding wound around the magnetic material and an output control switch controlling a current flowing through the third winding; and
   a control signal generator configured to:
      generate a control signal that controls a main switch for controlling an input-side current path and an output-side current path of the DPP converter,
      generate a first control signal that simultaneously controls the first main switch and the second main switch,
      generate a second control signal that operates the output control switch complementary to the first main switch,
      during a first period, set the first control signal to a turn-on voltage to induce a current flow through the first winding and the second winding and block a current flow in the output circuit,
      induce a leakage current to flow to a third PV module in which a surplus current does not occur when the surplus current occurs in the first PV module or the second PV module,
      adjust a pulse width of the control signal such that a magnetizing current of the DPP converter becomes substantially zero.

2. The solar cell system of claim 1, wherein, during a second period and a third period subsequent to the first period, the control signal generator is configured to reduce the magnetizing current by setting the first control signal to a turn-off voltage.

3. The solar cell system of claim 2, wherein, during a fourth period subsequent to the third period, the control signal generator is configured to reduce a current applied to a magnetizing inductor of the DPP converter such that the magnetizing current has a zero current characteristic by setting the second control signal to the turn-on voltage to induce the current flow only in the output circuit.

4. The solar cell system of claim 3, wherein, during a fifth period subsequent to the fourth period, the control signal generator is configured to discharge energy stored in a leakage inductance of the third winding by setting the second control signal to the turn-off voltage.

5. The solar cell system of claim 4, wherein, during a sixth period subsequent to the fifth period, the control signal generator is configured to perform a zero voltage switching of the first main switch and the second main switch by setting the first control signal to the turn-on voltage.

6. The solar cell system of claim 1, wherein the control signal generator includes a first controller configured to remove a deviation between the magnetizing current and a reference current having a value of zero such that the magnetizing current has a zero current characteristic.

7. The solar cell system of claim 6, wherein the first controller is configured to sense the magnetizing current and compare an average value of the sensed magnetizing current with the reference current to obtain the deviation.

8. The solar cell system of claim 7, wherein the first controller comprises:
   a low-pass filter configured to average the magnetizing current;
   a first analog-to-digital converter configured to convert an output of the low-pass filter into a first digital signal;
   a comparator configured to compare an output value of the first analog-to-digital converter with a reference voltage; and
   a proportional integral controller configured to proportionally integrate an output result of the comparator to output a first duty that determines a duty of the control signal for removing the deviation.

9. The solar cell system of claim 8, wherein the control signal generator further comprises a second controller configured to enhance a dynamic characteristic determining a duty.

10. The solar cell system of claim 9, wherein the second controller is configured to generate a second duty to reflect a predicted defect based on an input voltage average value obtained by averaging an input voltage of the first PV module and an input voltage of the second PV module, and a battery voltage.

11. The solar cell system of claim 10, wherein the second controller comprises:
   a second analog-to-digital converter configured to convert the input voltage of the first PV module, the input voltage of the second PV module, and the battery voltage into a second digital signal to generate a first digital input voltage, a second digital input voltage, and a digital battery voltage, respectively;
   an average value calculator configured to calculate an average between the first digital input voltage and the second digital input voltage to calculate the input voltage average value in a digital form; and
   a feedforward controller configured to generate the second duty, based on the input voltage average value and the digital battery voltage.

12. The solar cell system of claim 11, wherein the feedforward controller is configured to generate the second duty to be inversely proportional to a sum of the input voltage average value and the digital battery voltage and to be proportional to the input voltage average value.

13. The solar cell system of claim 10, wherein the control signal generator further includes a combiner configured to add the first duty and the second duty to generate a final duty that determines the pulse width of the control signal.

14. The solar cell system of claim 13, wherein the control signal generator further comprises a pulse width modulation controller configured to perform a pulse width modulation based on the duty of the control signal to output the control signal.

15. The solar cell system of claim 1, wherein a winding ratio of the first winding, the second winding, and the third winding is 1:1:1.

16. The solar cell system of claim 1, wherein the first input circuit and the second input circuit constitute a flyback DPP converter.

17. A solar cell system comprising:
- a differential power processing (DPP) converter configured to convert electricity generated by a first photovoltaic (PV) module and a second PV module connected in series with each other, using a magnetic material having a multi-winding structure, and to provide the converted electricity to a battery;
- a control signal generator configured to generate a control signal that controls a main switch for controlling an input-side current path and an output-side current path of the DPP converter;
- a first controller configured to adjust a pulse width of the control signal such that a magnetizing current of the DPP converter becomes substantially zero; and
- a second controller configured to improve a dynamic characteristic in which the first controller adjusts the pulse width of the control signal.

18. A method of operating a solar cell system comprising a first photovoltaic (PV) module and a second PV module connected in series with each other; a differential power processing (DPP) converter comprising a magnetic material having a multi-winding structure, a first input circuit connected to the first PV module and including a first winding wound around the magnetic material and a first main switch controlling a current flowing through the first winding, a second input circuit connected to the second PV module and including a second winding coupled to the first winding and wound around the magnetic material and a second main switch controlling a current flowing through the second winding, and an output circuit connected to a battery and including a third winding wound around the magnetic material and an output control switch controlling a current flowing through the third winding; and a control signal generator, the method comprising:

- converting, by the DPP converter, electricity generated by the first PV module and the second PV module to provide converted electricity to the battery;
- generating, by the control signal generator, a control signal that controls a main switch for controlling an input-side current path and an output-side current path of the DPP converter, generating, by the control signal generator, a first control signal that simultaneously controls the first main switch and the second main switch;
- generating, by the control signal generator, a second control signal that operates the output control switch complementary to the first main switch;
- during a first period, setting, by the control signal generator, the first control signal to a turn-on voltage to induce a current flow through the first winding and the second winding and block a current flow in the output circuit;
- inducing a leakage current to flow to a third PV module in which a surplus current does not occur when the surplus current occurs in the first PV module or the second PV module; and
- adjusting a pulse width of the control signal such that a magnetizing current of the DPP converter becomes substantially zero.

19. The method of claim 18, further comprising, during a second period and a third period subsequent to the first period, reducing the magnetizing current by setting, by the control signal generator, the first control signal to a turn-off voltage.

20. The method of claim 19, further comprising, during a fourth period subsequent to the third period, reducing a current applied to a magnetizing inductor of the DPP converter such that the magnetizing current has a zero current characteristic by setting, by the control signal generator, the second control signal to the turn-on voltage to induce the current flow only in the output circuit.

* * * * *